United States Patent [19]

Howell et al.

[11] Patent Number: 5,356,936

[45] Date of Patent: Oct. 18, 1994

[54] PROCESS FOR PRODUCING HYDROPHILIC POLYMER MEMBRANES

[75] Inventors: Barbara F. Howell; Ravanasamudram S. Venkatachalam, both of Arnold; John P. Wehrle, Riverdale, all of Md.

[73] Assignee: The United States of America as represented by the Secretary of the Navy, Washington, D.C.

[21] Appl. No.: 128,289

[22] Filed: Sep. 28, 1993

[51] Int. Cl.$^5$ ............................................. C08J 5/20
[52] U.S. Cl. ................................. 521/27; 204/157.87; 204/157.9; 428/290; 428/333; 521/31; 521/51
[58] Field of Search ................... 521/27, 31, 51; 204/157.87, 157.9; 428/290, 333

[56] References Cited

U.S. PATENT DOCUMENTS 5,147,549  9/1992  Chou et al. .................... 210/640

*Primary Examiner*—Bernard Lipman
*Attorney, Agent, or Firm*—Charles D. Miller

[57] ABSTRACT

Hydrophilicity of hydrophilic polymers, in the form of heat-crosslinked coatings on porous membranes, is increased by exposure to an oxygen plasma, preferably for about 60 seconds. The plasma is generated at an oxygen gas pressure of about 1.5 Torrs in a chamber subjected to radio frequency electromagnetic radiation with a power of 25–100 watts. Such highly hydrophilic membranes have increased efficiency and durability when used as ultrafiltration membranes for separating hydrophobic and hydrophilic materials, such as smoke-air and oil-water mixtures.

10 Claims, No Drawings

5,356,936

PROCESS FOR PRODUCING HYDROPHILIC POLYMER MEMBRANES

The invention described herein may be produced and used by or for the Government of the United States of America for governmental purposes without the payment of any royalties thereon or therefor.

BACKGROUND OF THE INVENTION

1. Field of the Invention

This invention relates to enhancing the water affinity of a wide variety of membranes coated with extremely hydrophilic polymers and specifically to membranes coated with poly(2-acrylamido-2-methyl-propane sulfonic acid) (PAMPS). It particularly relates to use of an oxygen plasma for such enhancement.

2. Review of the Prior Art

Ultrafiltration and/or dialysis membranes are barriers which permit selective transport of solvent and some solutes across them. They are used in a variety of industrial applications, ranging from the re-concentration of dilute paint dispersions to the isolation of food products and pharmaceuticals, and in biomedical applications such as hemodialysis. Such membranes are typically produced in three general physical formats: sheet membranes, hollow fibers, and tubes.

Most permselective membranes disclosed in the literature are produced by solution/coagulation processes wherein a solubilized polymer is cast as a thin film and then coagulated in a non-solvent liquid. The non-solvent is generally selected from one of many liquids which are miscible with the solvent but which reduce its solvent power, causing loss of polymer solubility when added to the solvent.

Conventional synthetic membranes used for reverse osmosis (RO) and for ultrafiltration (UF) are made of polymers that are insoluble in the fluids, such as water and air, that act on the membranes. Typically, a linear polyamide, polysulfone, or cellulose acetate is cast from an organic solvent and coagulated in water. Although such membranes are rigid and physically strong, they are hydrophobic in nature and tend to foul through adsorption of hydrophobic particles and solutes in the feed stream. Such fouling is a major problem in industrial use of membranes, making frequent cleaning or costly pretreatment necessary.

Although hydrophilic polymers, particularly highly sulfonated ones, have been shown to resist such adsorptive fouling, they either dissolve in water or form a soft gel. Useful membranes may be formed of such polymers only by a high degree of crosslinking, so that they swell not more than 3–5 times by weight when soaked in water. Since the pore structure of such membranes is generally created by coagulation and since monomers are essentially incoagulable, the only practical route is post-crosslinking of the linear polymer so that the individual polymer chains are joined at many points to yield an interconnected network. The crosslinks may be ionic in character, as in complexes of poly-acids with poly-bases, but covalent or chemical crosslinking is stronger, more resistant to hydrolysis, and more versatile in its applications.

Since crosslinked polymers cannot be dissolved, melted, or cast, the polymerization or post-crosslinking must be carried out in the final physical shape required. The most common way of achieving covalent crosslinking is to use a polyfunctional monomer in the polymerization reaction itself. Problems, however, often arise in the preparation of films and membranes when catalysts must be introduced or inhibitors such as oxygen must be excluded from the polymerization reaction. Furthermore, the monomers themselves are often too toxic, volatile, or fluid to be conveniently processed in this manner. All of these factors make the manufacturing process difficult and costly.

Conventional methods of preparing hydrophilic polymer membranes involve use of a solution of the polymer in an appropriate solvent such as ethanol or water at a concentration ranging from 2 to 20% polymer. A polymeric membrane is employed as a substrate for depositing the polymer thereon as a thin coating.

For example, as taught in U.S. Pat. No. 5,039,420, highly hydrophilic, substantially uncharged semipermeable membranes based on copolymers of acrylonitrile and hydroxy-$C_2$-$C_4$ alkyl esters of (meth)acrylic acid, preferably in flat sheet or hollow fiber form, are prepared by dissolving the AN copolymers in a polar organic solvent in which they are very soluble and then by casting the copolymer solution on a suitable substrate or by extruding to produce hollow fibers, and finally by quenching with a coagulation solution.

Polymer membranes traditionally are made hydrophilic by incorporation of groups such as hydroxyl, carboxyl, carboxy salts, or sulfonic acid. Conventional RO membranes tend to suffer compaction or swelling over a period of time and are highly susceptible to biological and chemical attack (particularly chlorination).

For certain filter applications, as for example for a spinning microfilter employed to separate smoke particles from air, use of a membrane which is extremely hydrophilic is essential to prevent clogging of the filter. Increases in hydrophilicity increasingly prevent clogging and enhance filter efficiency. Clogging is prevented because deposited hydrophobic material is scrubbed off by the Taylor vortices generated by the spinning of the inner cylindrical filter.

When polymeric gels or films are prepared, as taught in U.S. Pat. No. 4,596,858, by dissolving in a suitable solvent a linear polymer or polymers containing pendant amidocarbonyl or oxycarbonyl groups, hydroxyl groups (present as either pendant groups from the polymer or as a low molecular weight polyol), and a strongly acidic catalyst (which may also be a pendant group from the polymer), by drying or coagulation of the gel to remove the solvent, and by curing the gel at a high temperature, some of the amido-carbonyl or oxycarbonyl groups are alcoholized to form ester linkages that crosslink and insolubilize the gel. These post-crosslinked membranes have physical strength and controlled porosity and mitigate the effect of polymer chain scission, thus enabling reverse osmosis membranes, for example, to keep their selectivity under conditions of use.

Crosslinked poly(acrylamido-2-methylpropane sulfonic acid) (PAMPS) membranes which have been prepared as taught in Examples 7 and 22 of U.S. Pat. No. 4,596,858 have been found to be more hydrophilic than similar materials which have a carboxyl or aliphatic group in place of the sulfonic acid group. Such carbonyl-containing PAMPS membranes, films, and solid gels are stated to have excellent strength, controlled pore size, and controlled swelling.

U.S. Pat. No. 5,028,453 describes a procedure for reducing the tendency of a surface to foul, by treatment of any of a variety of surfaces with plasma of a compound which generates hydroxyl groups. Generating compounds include a diol, a triol, or a polyol containing four or less carbon atoms per molecule. Surfaces for which hydrophilicity is increased include glass, ceramics, alumina, steel, carbon, and a wide variety of polymer materials.

Applicant has found experimentally that sufficiently cross-linked PAMPS membranes can be used to separate oil/water mixtures. However, the processes disclosed in the prior art for producing cross-linked PAMPS do not produce sufficient cross-linking for oil/water separation.

There is accordingly a need for a method of additional solid-state crosslinking of PAMPS membranes.

Other applications of oxygen plasma treatments include treatment of ultrahigh molecular weight polyethylene fibers. Such treatment has been shown by Occhiello et al, in *J. of Appl. Polym. Sci.* 42, 551–559 (1991), to enhance adhesion to a resin matrix, and adhesion can be related to surface free energy. These investigators showed that treatment increases surface concentration of —OH, —C=O, and —COOH groups. Treatments were done for as long as 10 minutes; however, no increase in surface free energy was found after 2 minutes when 70–100 watts of power were used at a pressure of 0.1–0.2 Torr.

Oxygen plasmas have also been employed by Ramesh et al, *Polym Sci: Part B. Polym. Phys.* 29, 1031–1034 (1991), to etch polymer mixtures of aliphatic and aromatic polymers for revealing their microstructures. Aliphatic polymers are more susceptible to being etched away than are aromatic polymers, and the plasma etch therefore preferentially eats away the aliphatic component, thereby exposing details of the microstructure which are observable with a scanning electron microscope. For this work, the polymer mixture was subjected to an oxygen plasma for 10 minutes at 50 watts with an oxygen pressure of 400 mTorrs.

SUMMARY OF THE INVENTION

It is therefore an object of this invention to provide a method for enhanced solid-state crosslinking of PAMPS and other coatings on membranes.

It is another object to provide a method for enhancing the hydrophilic capacity of PAMPS and other coatings on membranes.

In accordance with these objects and the principles of this invention, a process has surprisingly been discovered that allows the amount of surface hydrophilic character of a polymer coating on a carrier or support membrane to be adjusted to a desired extent by treating the coating with an oxygen plasma. After treatment, the coated membrane may be used to separate hydrophobic materials such as smoke and oil from materials which are hydrophilic such as air and water, exemplified by passage of oil/water and smoke/air mixtures through a spinning microfilter.

A support membrane, which may be porous nylon (e.g., a porous nylon with a pore size of 1–200 micrometers) or porous Dacron ®, is immersed in a polymer solution so that a polymer coating of the desired thickness is deposited on the membrane. This coated membrane is crosslinked by heating, as taught in U.S. Pat. No. 4,596,858, and is then subjected to an oxygen plasma. The method is applicable to poly(2-acrylamido-2-methylpropane sulfonic acid) (PAMPS) polymers and a variety of other polymers, including polycarbonate, polyketone, polyester, polyacrylate, polymethacrylate, polyacrylonitrile, polysulfone, polyether sulfone, polyamide, polyetherimide, polyvinylidene difluoride, cellulose, nitrocellulose, and cellulose esters.

The process is also applicable to many hydrophilic polymers which include a variety of acrylate and methacrylate compounds such as poly(methylacrylamidopropyltrimethyl ammonium chloride), poly(N-n-butyl acrylamide), poly(N-n-butyl methacrylamide), poly(N,N-di-n-butylacrylamide), and poly((2-sulfoethyl methacrylate), and styrenic sulfonic acid compounds such as poly(styrene sulfonic acid).

The invention has been demonstrated to be suitable for polymers which have pendant amidocarbonyl, oxycarbonyl, or hydroxyl groups (present as low molecular weight polyols). These have been shown to form substantially improved crosslinked gels. Because they have been crosslinked in the absence of solvent, they form a tight network that swells little in solvent. The polymer of which the hydrophilicity is to be increased is deposited from a solution on a polymeric substrate membrane which may be nylon, urethane, or other polymer. The coated membrane is then heated for a suitable length of time in an oven at an appropriate temperature (100° to 200° C.) so that the polymer coating becomes crosslinked. The membrane is next placed in an oxygen plasma, generated by subjecting it to oxygen gas at a pressure of 1.5 Torrs. The plasma is generated by subjecting the oxygen to radiofrequency electromagnetic radiation with a power of 25–100 watts.

For certain filter applications, as for example for a spinning microfilter employed to separate smoke particles from air or oil from water, use of an extremely hydrophilic membrane is essential for separating the hydrophobic component (smoke or oil) from the hydrophilic component (air or water). Therefore, increases in hydrophilicity produce enhancement of filter efficiency and prevent clogging.

A polymeric membrane, e.g., a porous nylon webbing having a pore size of 1 to 200 micrometers, is employed as a substrate for deposition of the polymer coating. These materials were used to produce the PAMPS-coated membranes for applying the method of this invention.

The method has been successfully applied to PAMPS coatings having a pendant amidocarbonyl group, which have been prepared as described in U.S. Pat. No. 4,596,858, by the following experimental method:

A. a support membrane, selected from the group consisting of porous nylon and polyester, is immersed in a slightly basic polymer solution containing glycerine so that a polymer coating of a desired thickness is deposited on the membrane;

B. the membrane coating is crosslinked by heating at about 150° C. for about three hours; and C. the membrane having the crosslinked coating is placed for 0.5 to 1.5 minutes in an oxygen plasma, generated at an oxygen gas pressure of approximately 1.5 Torrs in a chamber subjected to radiofrequency electromagnetic radiation with a power of 25 to 100 watts.

The plasma treatment is effective within the range of 30 to 90 seconds, but approximately 60 seconds is best. Excessive plasma treatment etches the membrane and produces damage and loss of PAMPS, caused in part by oxidation and vaporization of some of the PAMPS and of the support membrane. If the PAMPS membrane is left in the plasma too long, the entire membrane is burned away.

Thickness measurements of an original membrane without PAMPS, after adding PAMPS, after crosslinking by heating and equilibrating at 48% humidity, and after plasma treatment and re-equilibration at 48% humidity gave the same value, 0.005 inch. It was accordingly not possible to use thickness measurements as a means of determining swelling from PAMPS coating, plasma treatment, or humidity equilibration with available equipment.

Subjection to an oxygen plasma has been found to increase the extent of crosslinking of an already crosslinked polymer. Crosslinking decreases the tendency of the polymer to swell when placed in water or in a humid environment, allows the polymer coating to retain its porosity, and decreases its solubility in solvents. Hydrophilicity, as measured by weighing the coated membrane after it is held in a chamber at a selected humidity for an equilibrating period, has been found to be increased by as much as 100% by the oxygen plasma treatment.

An advantage of this invention is that the hydrophilicity of a polymer coating on a membrane can be easily controlled. Since the method is applicable to a wide variety of polymers, expensive polymer types are not required for production of highly hydrophilic surfaces. In addition, the membrane becomes more durable and less soluble after the plasma treatment.

DESCRIPTION OF THE PREFERRED EMBODIMENTS

The general procedure for preparing a plasma-treated membrane is as follows:
A. 1.0 g PAMPS and 0.09 g glycerol were dissolved in 25 mLs ethanol to which 4 drops of saturated NaOH were added;
B. a substrate membrane was immersed in the PAMPS solution, and excess solution was removed by passing the membrane between two metal rods;
C. the coated membrane was heated for 3 hours at 150° C. in order to crosslink the PAMPS coating; and
D. the coated and crosslinked membrane was placed for one minute in an oxygen plasma, generated at an oxygen gas pressure of approximately 1.5 Torrs in a chamber subjected to radio frequency electromagnetic radiation with a power of 25 to 100 watts, producing a coated membrane having enhanced cross-linking and hydrophilicity.

EXAMPLES 1–8

Experiments were made in order to determine the water absorbing capacity of PAMPS coated membranes after one minute in an oxygen plasma. Larger membranes were weighed before and after being dipped in PAMPS solution. These weights were used to determine the weight of PAMPS per square centimeter of membrane. The larger membranes were then cut into smaller samples for which areas were measured. These samples were used for Examples 1–8, and the weight of PAMPS on each sample was calculated from its area and the weight per unit area.

TABLE

Additional Water Absorbing Capacity of PAMPs Coated Membranes after One Minute in an Oxygen Plasma

| Ex. No. | Plasma Treatment Before[1] g | Plasma Treatment After[2] g | Humidity Equilibrated g | Weight Gain[4] g | Weight of PAMPS on membrane[5] g | % Water Gain per g PAMPS | Avg ± SD |
|---|---|---|---|---|---|---|---|
| 1 | 0.3294 | 0.3170 | 0.3326[3] | 0.0025 | 0.0226 | 11.1[6] | |
| 2 | 0.3274 | 0.3221 | 0.3306[3] | 0.0033 | 0.0225 | 13.2[6] | |
| 3 | 0.3645 | 0.3533 | 0.3670[3] | 0.0021 | 0.0250 | 8.4[6] | |
| 4 | 0.3745 | 0.3632 | 0.3770[3] | 0.0028 | 0.0257 | 10.9[6] | 10.9 ± 1.9 |
| 5 | 0.3398 | 0.3312 | 0.3423[7] | 0.0025 | 0.0233 | 10.7[8] | |
| 6 | 0.3320 | 0.3241 | 0.3353[7] | 0.0033 | 0.0228 | 14.5[8] | |
| 7 | 0.2686 | 0.2626 | 0.2707[7] | 0.0021 | 0.0184 | 11.4[8] | |
| 8 | 0.3395 | 0.3318 | 0.3423[7] | 0.0028 | 0.0233 | 12.0[8] | 12.2 ± 1.6 |

[1] Weight of membrane sample coated with PAMPS, crosslinked by heating, and equilibrated to 48% relative humidity.
[2] Weight of membrane sample after treatment for one minute in an oxygen plasma for enhanced crosslinking, without humidity equilibration.
[3] Weight of membrane sample after plasma treatment and equilibration by 3 days at 48% relative humidity.
[4] Weight of plasma treated membrane equilibrated to 48% relative humidity minus weight of the membrane sample similarly equilibrated before plasma treatment.
[5] Weight of PAMPS on the membrane was calculated by subtracting the weight of the membrane equilibrated at 48% relative humidity from the weight of the membrane with PAMPS equilibrated to 48% relative humidity.
[6] Percent weight gain is the additional weight gained by the PAMPS coating on the membrane after plasma treatment and re-equilibration to 48% relative humidity.
[7] Weight of membrane sample after plasma treatment and equilibration by 3 days at 70% relative humidity.
[8] Percent weight gain is the additional weight gained by the PAMPS coating on the membrane after plasma treatment and re-re-re-equilibration to 70% relative humidity.

Because it will be readily apparent to those skilled in the art of preparing hydrophilic membranes that innumerable variations, modifications, applications, and extensions of the examples and principles hereinbefore set forth can be made without departing from the spirit and the scope of the invention, what is hereby defined as such scope and is desired to be protected should be measured, and the invention should be limited, only by the following claims.

What is claimed is:

1. A process for enhancing the crosslinking and hydrophilicity of a hydrophilic polymer that is disposed as a coating on a porous membrane to form a coated membrane said process comprising exposing said coated membrane to an oxygen plasma to form a highly hydrophilic membrane having increased efficiency and durability for separating hydrophobic and hydrophilic materials wherein said hydrophilic polymer is prepared from monomers selected from the group consisting of methylacrylamidopropyltrimethyl ammonium chloride, N-n-butyl acrylamide, N-n-butyl methacrylamide, acrylamide-methyl-propane sulfonic acid N,N-di-n-butylacrylamide, and 2-sulfoelthyl methacrylate.

2. The process of claim 1, wherein said materials comprise oil-and-water mixtures and smoke-and-air mixtures.

3. The process of claim 1, wherein said monomers comprise 2-acrylamido-2-methylpropane sulfonic acid.

4. The process of claim 3, wherein said 2-acrylamido-2-methyl-propane sulfonic acid is dissolved in water, purged of nitrogen at ambient temperature, mixed with potassium peroxydisulfate, and maintained at about 40° C. for about 16 hours to prepare poly(2-acrylamido-2-methyl propane sulfonic acid) (PAMPS).

5. The process of claim 4, wherein said highly hydrophilic membrane is prepared by:
   A. dissolving said poly(2-acrylamido-2-methyl propane sulfonic acid) and glycerol in ethanol containing NaOH to form an ethanol solution;
   B. immersing a substrate membrane in said ethanol solution;
   C. removing excess solution from said membrane to form a coated membrane;
   D. heating said coated membrane for about 3 hours in order to crosslink said poly(2-acrylamido-2-methyl propane sulfonic acid); and
   E. exposing said coated and crosslinked membrane for 30–90 seconds in an oxygen plasma, producing a coated membrane having enhanced crosslinking and enhanced hydrophilicity.

6. The process of claim 5, wherein said heating is at about 150° C.

7. The process of claim 5, wherein said oxygen plasma is generated at an oxygen gas pressure of approximately 1.5 Torrs in a chamber subjected to radio frequency electromagnetic radiation with a power of 25 to 100 watts.

8. The process of claim 5, wherein said substrate membrane is selected from the group consisting of porous nylon, porous polyurethane, and porous Dacron®.

9. The process of claim 8, wherein said membrane has a pore size of 1–200 micrometers.

10. The process of claim 2, wherein said highly hydrophilic membrane has increased efficiency and durability for ultrafiltration of said oil-and-water mixtures and said smoke-and-air mixtures.

* * * * *